United States Patent [19]

Krenzer

[11] Patent Number: 4,525,108
[45] Date of Patent: Jun. 25, 1985

[54] CUTTER AND METHOD FOR GEAR MANUFACTURE

[75] Inventor: Theodore J. Krenzer, West Rush, N.Y.

[73] Assignee: The Gleason Works, Rochester, N.Y.

[21] Appl. No.: 442,689

[22] Filed: Nov. 18, 1982

[51] Int. Cl.³ .......................... B26D 1/12; B21K 21/00
[52] U.S. Cl. .................................. 407/22; 76/101 A
[58] Field of Search ................... 407/21, 22; 76/101 A

[56] References Cited

U.S. PATENT DOCUMENTS

| | | |
|---|---|---|
| 1,648,380 | 11/1927 | Dover . |
| 2,648,894 | 8/1953 | Wildhaber ............................ 407/22 |
| 2,823,448 | 2/1958 | Krumme ............................. 407/22 |
| 2,932,239 | 4/1960 | Wildhaber . |
| 3,218,931 | 11/1965 | Kotthaus . |
| 3,222,990 | 12/1965 | Rebeski . |
| 3,487,592 | 1/1970 | Kotthaus . |
| 3,760,476 | 9/1973 | Kotthaus . |
| 3,961,403 | 6/1976 | Hunkeler . |
| 4,060,881 | 12/1977 | Ryan et al. ........................ 407/22 |
| 4,090,428 | 5/1978 | Kotthaus et al. . |
| 4,093,391 | 6/1978 | Bachmann et al. ................. 407/22 |
| 4,137,001 | 1/1979 | Fountain ............................ 407/115 |
| 4,183,182 | 1/1980 | Kotthaus ............................ 51/288 |
| 4,260,299 | 4/1981 | Ryan et al. ......................... 407/22 |

FOREIGN PATENT DOCUMENTS

| | | |
|---|---|---|
| 112923 | 12/1975 | Fed. Rep. of Germany . |
| 395194 | 1/1974 | U.S.S.R. ............................. 407/22 |
| 524627 | 11/1976 | U.S.S.R. ............................. 407/22 |

OTHER PUBLICATIONS

"Spiral Bevel Gear Generating Machine AMK-400", Klingelnberg Co., Catalog #1279e.
"Oerlikon Spiromatic Spiral Bevel Gear Cutters", Oerlikon Co., Catalog #E6110.

Primary Examiner—Leonidas Vlachos
Attorney, Agent, or Firm—Morton A. Polster; Ralph E. Harper

[57] ABSTRACT

A cutter head assembly and method of assembly design for use with a continuously indexing gear cutting machine is described as including slots formed through the face of said assembly of particular orientation for receiving cutting tools characterized by their front faces requiring no resharpening. The assembly is adaptive to cut a range of job requirements while preserving the front face portion of the cutting tools.

2 Claims, 5 Drawing Figures

CUTTER AND METHOD FOR GEAR MANUFACTURE

BACKGROUND AND BRIEF DESCRIPTION OF INVENTION

The invention relates to face mill cutter head assemblies of the continuous indexing type adapted for use in gear cutting machines. The cutter head is designed to receive tools characterized by their front face portions requiring no resharpening. More particularly, the invention relates to improvements in cutter head assemblies of the aforesaid type whereby the front face portions of the cutting tools mounted therein may be preserved during resharpening. In addition, the invention provides for a method for designing such cutter head assemblies.

The use of cutting blades where sharpening stock is removed from the shank portion in a fashion that preserves the front face portion of these tools is well known in the art of metal cutting (for example see U.S. Pat. No. 1,648,380). Practical advantages of using such blades are also well known in the art of gear cutting as discussed in U.S. Pat. Nos. 3,961,403; 4,060,881; and East German Pat. No. 112923 (1975). Recent application of blade coating processes has resulted in improved tool performance and tool life. Cutter head designs which permit the use of blades of the above-mentioned type possess the further advantage of benefiting from such coating processes despite repeated sharpenings. Appreciable savings in productivity and tool costs can be realized as the original coating is preserved on the tool face for the entire service life of the tool.

It is also known to use bar-stock type blades of generally quadralateral cross-section in face hobbing type cutter heads. The use of such blades where sharpening stock is taken from the shank portion obviates the need for corrective radial adjustment subsequent to resharpening as is common in face mill hobbing cutters using conventional blades. A head design of this type is disclosed in U.S. Pat. No. 3,760,476. While this design permits the use of blades with sharpening stock in the blade shank portion, special requirements of cutting edge alignment inherent to the hobbing process have hitherto precluded the use of sharpening processes which preserve the face portion of the tool.

It is common practice in the manufacture of bevel and hypoid gear sets according to the face hobbing process to generate mating members on the basis of a theoretical crown gears. When edges of cutting blades for both members coincide with respect to a plane normal to the longitudinal tooth curve of the imaginary common crown gear, the members can then be generated conjugate to each other. Failure of the cutting edges for both members to coincide may result in undesirable mismatch of mating gear teeth. Heretofore, it has been common practice to maintain the correct disposition of cutting edges in the face hobbing process by grinding the front faces of cutting blades.

It is an object of this invention to disclose a novel cutter assembly of the face hobbing type for the production of conjugate bevel and hypoid gears when utilizing bar-stock type blades having front faces preserved during resharpening.

Another object of this invention is to disclose a cutter assembly of the above mentioned type wherein a given range of job requirements may be accomodated and deleterious tooth mismatch avoided without necessitating corrective adjustment of cutting blade faces.

Other objects and features of this invention will become apparent in the detailed discussion which follows. In that discussion reference will be made to the accompanying drawings as briefly described below:

DETAILED DESCRIPTION OF INVENTION

Figure 1:
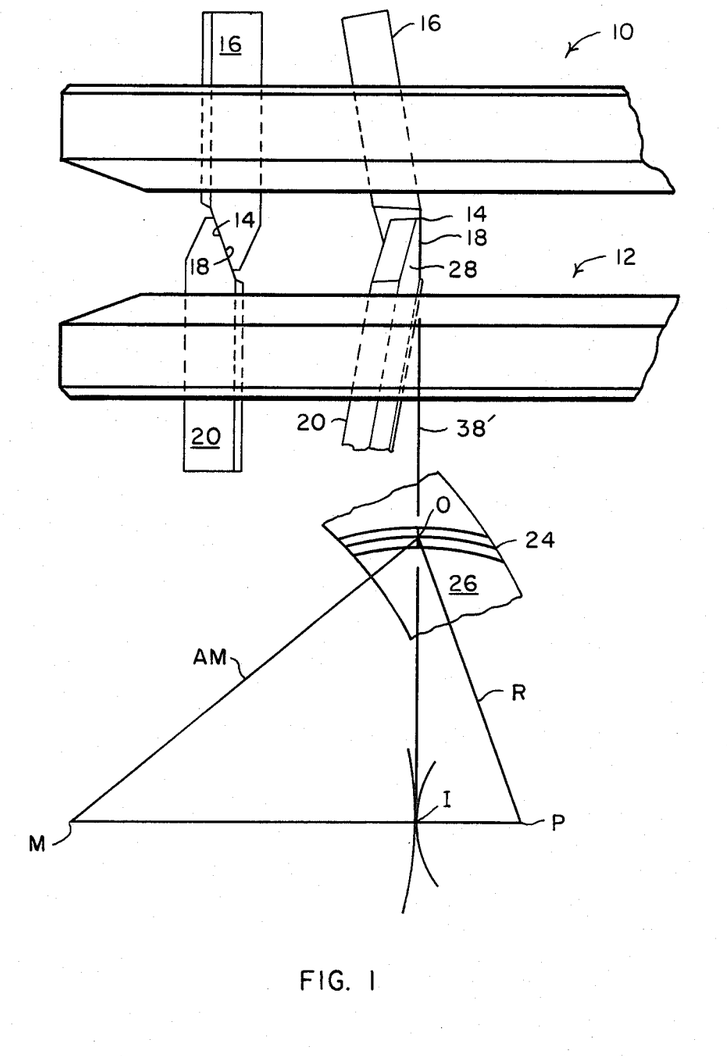
FIG. 1 is a schematic representation of geometric relationships involved in the design of a face hobbing cutter system.

It is the accepted practice for face hobbing bevel and hypoid gear sets to employ a pair of opposite hand cutting assemblies that are generally mirror symmetrical. Mating tooth surfaces are conjugately generated by the axial alignment of blade cutting edges on opposing cutters with respect to a plane extending normal to the longitudinal tooth curve of an imaginary common crown gear. This approach is schematically represented in FIG. 1. For sake of illustration, "left hand" cutter assembly 10 is shown inverted with respect to "right hand" cutter assembly 12. Cutting edge 14 of outside blade 16 is aligned to the same plane as cutting edge 18 of inside blade 20. This plane corresponds to plane 38' normal to the midpoint O of the longitudinal tooth curve associated with an imaginary crown gear 26. A similar relationship exists between the alternate inside and outside cutting edges (not shown) of opposing cutter assemblies for the generation of opposite side mating tooth surfaces. Heretofore, it has been the practice of the art to impose the desired axial alignment of cutting edges 14 and 18 with respect to normal plane 38' by specially forming or otherwise sharpening blade front faces 28.

Conventionally designed blades are provided with sharpening stock behind their front faces and cutting edge renewal is accomplished by removing a portion of this stock. The alternative blade form of the stick-type is provided with sharpening stock in the shank portion. While cutting edge renewal may be accomplished merely by reforming blade top and profile surfaces of stick-type blades, the special requirements of cutting edge alignment, as described above, associated with the face hobbing process have necessitated the corrective sharpening of blade faces as well. Corrective blade face sharpening is difficult to accurately accomplish, requiring specialized devices and thus unavoidably adds to manufacturing costs. This practice is described in more detail in U.S. Pat. No. 4,183,182 which discloses a method of sharpening cutting tools with the object of displacing cutting edges along blade shanks by grinding profile, top and front faces of the tool.

The cutter assembly of the present invention obviates the need for corrective blade face sharpening both upon initial assembly and during periodic renewal of blade cutting edges by incorporating a novel geometric method for designing cutter assemblies. For reasons of economy gear cutting heads are seldom designed to accomodate only the requirements of a single job and therefore must be adaptable for the manufacture of a practical range of gear geometries. It is believed that this further design consideration is chiefly responsible for precluding the effectual use of bar-stock type blades in which the front face portion is preserved during resharpening for face hobbing processes.

Figure 2:
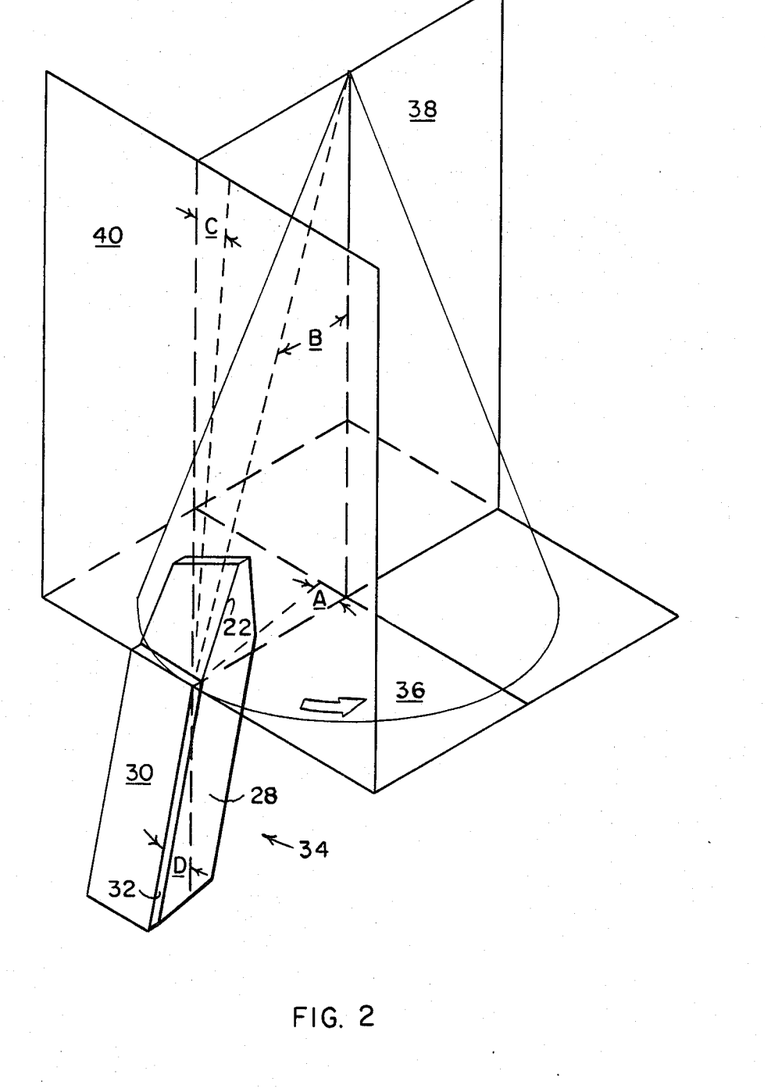
FIG. 2 is an isometric drawing showing geometric relationships of a cutter head design of the type disclosed in U.S. Pat. No. 4,060,881.

It is generally understood in the art of gear cutting that a fixed geometric relationship exists between the defining angles of respective blade surfaces associated with stick-type blades. Reference may be made to FIG. 2 in which relevant angles of cutting blade geometry are depicted. The blade which is shown in pentagonal in cross-section, having a back face (not visible in FIG. 2), two side faces (one of which is labeled 30), a front face 32 (which is perpendicular to the side face 30 and parallel to the back face of the blade), and a fifth face 28 which is formed by grinding away a portion of front face 32. The face 28 may be considered a cutting face and is the face which can be provided with a special coating or treatment. Angle A is a side rake angle formed at the intersection of blade face 28 with a plane of rotation 36. Angle B is a pressure angle determined by the projection of cutting edge 22 onto orthogonal plane 38, angle C is a hook angle as projected onto orthogonal plane 40, and angle D is the axial inclination of the blade body in plane 40. The following relationship is known to exist between these angles in terms of their absolute values:

$$\text{TAN }|C| = \text{TAN }|D| - \text{TAN }|A| \cdot \text{TAN }|B|$$

A more complete description of these angles and their inter-relationships may be found in U.S. Pat. No. 4,060,881. It is readily apparent from the above disclosure that appropriate blade hook may be realized by the relative adjustment of cutting parameter variables A and D. While the above mentioned intervariable relationship has for some time been used in the design of standard face mill gear cutting assemblies particularly for the establishment of cutting parameters, no evident counterpart had existed in the face hobbing art.

Figure 3:
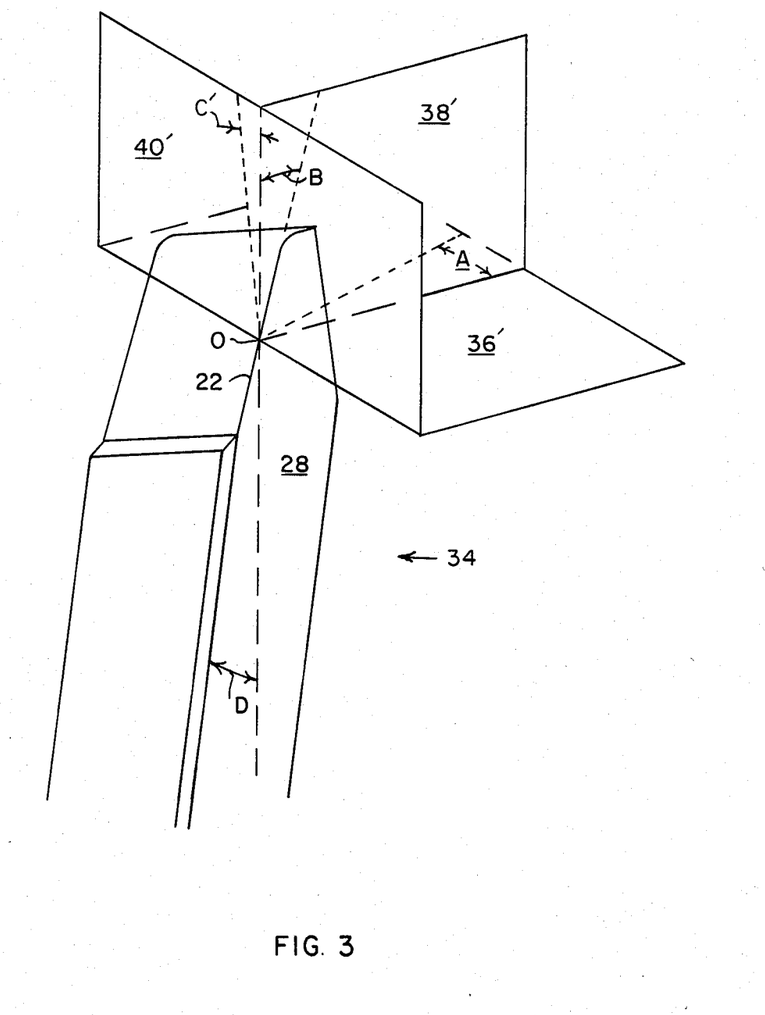
FIG. 3 is an enlarged view similar to FIG. 2, but showing geometric relationships of a cutter head designed in accordance with this invention.
Figure 4:
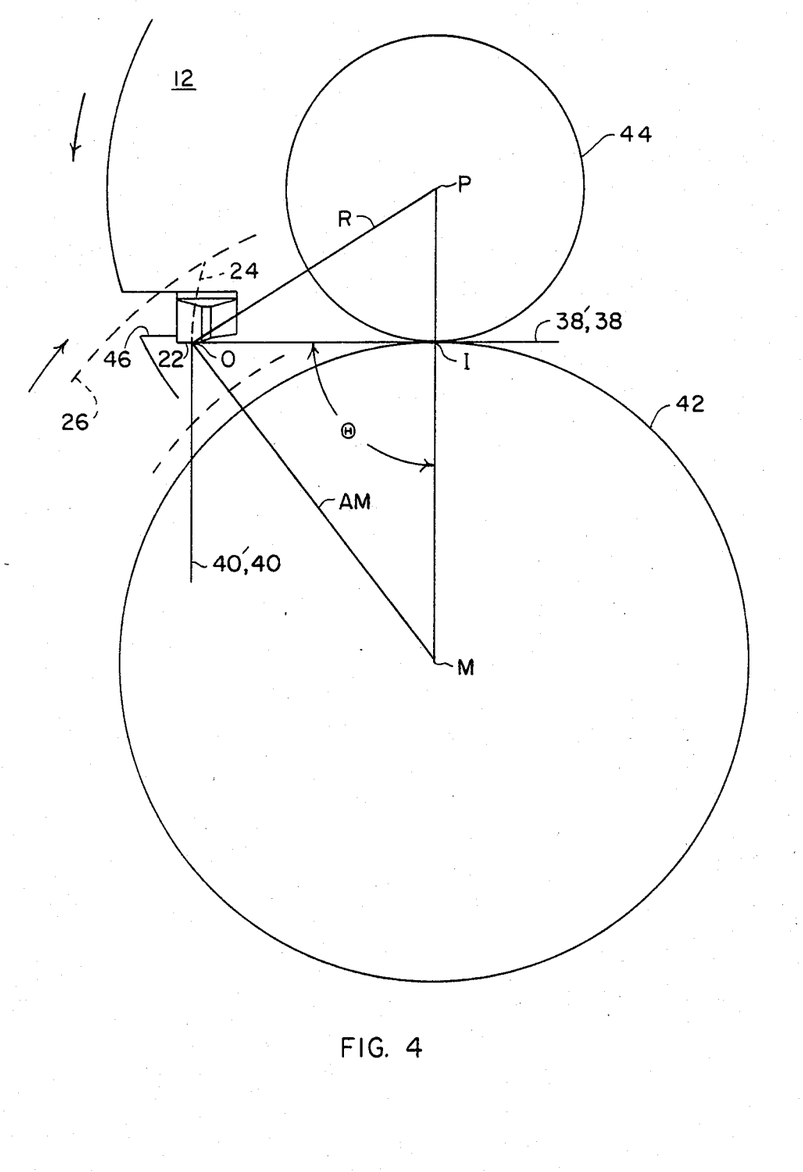
FIG. 4 is a schematic representation of a cutter head design in accordance with this invention.

For purposes of the present invention, and as shown in FIGS. 3 and 4, plane 38 (of FIG. 2) is considered coplanar with normal plane 38' of the imaginary crown gear 26. Orthogonal plane 40 (of FIG. 2) is coplanar with plane 40' tangent to longitudinal tooth curve 24. Midpoint O of longitudinal tooth curve 24 is located on cutting edge 22 and lies in the pitch point plane 36' coplanar with plane 36 (FIG. 2). The measure of hook angle in reference to the face hobbing process is taken from the projection of cutting edge 22 onto plane 40' and directed from the intersection of orthogonal planes 38' and 40'. The hook angle C' is thus a relative measure of the deviation of cutting edge 22 from normal plane 38'.

The alignment of corresponding blade cutting edges, i.e., C' equals zero degrees, as required by the face hobbing process may be readily accomplished by appropriate substitution of cutting parameter angles A and D with respect to B in the following equation:

$$\text{TAN }|B| = \text{TAN }|D|/\text{TAN }|A|$$

By achieving cutting edge alignment in accordance with these principles cutting blades may be resharpened without altering this alignment thus preserving the cutting blade faces.

Unlike standard face mill assemblies, however, where plane 38 corresponds to generally radially oriented blade slots, plane 38' of face hobbing assemblies is a function of a particular imaginary crown gear and is subject to vary independently of cutter head blade slots. The practical necessity of cutter heads to accomodate a range of crown gear geometries serves to supersede the original intervariable relationship by introducing a rotational consideration of orthogonal hobbing planes 36', 38' and 40° with respect to their original coincides with planes 36, 38 and 40.

In order to lend further aid to the understanding of the disposition of normal plane 38' with respect to cutter assembly 12 (or 10) a brief description of the relevant components of gear hobbing cutter theory is now provided with reference to FIG. 4. Crown gear 26 and cutter assembly 12 may be understood as rolling together in a timed epitrochoidal relationship. Instantaneous center of motion I is tangent to the respective centrodes 42 and 44 associated with crown gear 26 and cutter assembly 12. Centrodes 42 and 44 are dimensioned proportional to the ratio of the number of teeth in the imaginary crown gear versus the number of blade groups in the cutter assembly. Their exact measures are known to be readily determinable by those skilled in the hobbing art and are based upon dimensions particular to the crown gear and cutter assembly. Midpoint O of longitudinal tooth curve 24, also pitch point O on cutting edge 22 is located at the intersection of radius AM, which is the mean cone distance of crown gear 26, and radius R, which is the pitch point radius of assembly 12. Normal plane 38' is formed through points O, I.

Figure 5:
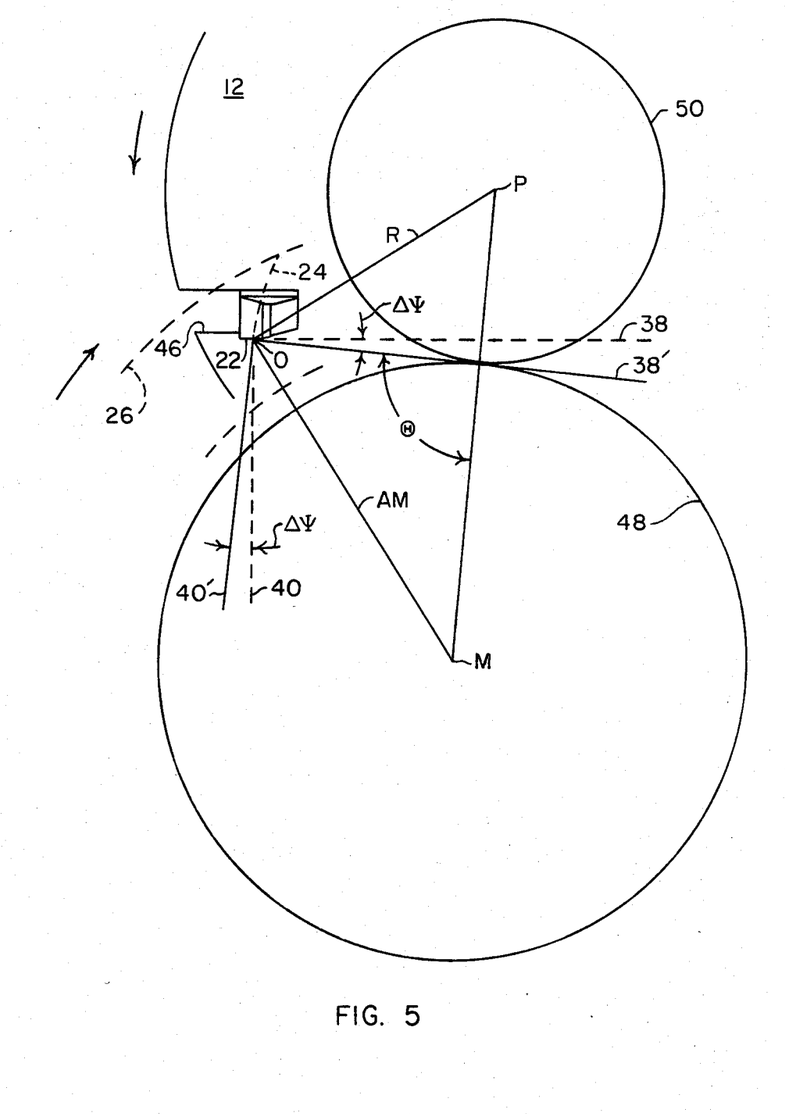
FIG. 5 is a schematic representation of crown gear variation with respect to the cutter head design shown in FIG. 4.

A change of crown gear geometry represented by centrodes 48 and 50 is depicted in FIG. 5. Orthogonal planes 38' and 40' originally coincident with planes 38 and 40 are rotated about common center O through angle $\Delta\Psi$. Accordingly, hook angle C' is no longer exclusively dependent upon variables A, B and D as measured in orthogonal planes 36, 38 and 40 but is also a function of this rotation as given below:

$$\text{TAN }C' = \text{TAN }D \cdot (\text{SIN }(\Delta\Psi) \cdot \text{TAN }(\Delta\Psi + A) + \text{COS }(\Delta\Psi)) + \text{TAN }(\Delta\Psi + A) \cdot \text{TAN }(B')$$

where for convenience desired pressure angle B' is measured in the rotated normal plane and angles A and D are referenced with the original planes of the assembly.

It should also be noted that the effective cutting rake of side rake angle A as provided on cutting blades 34 is directly affected by changes of crown gear geometry. More seriously, the effect is opposite for inside and outside blades of the same assembly. The equation below serves to illustrate this point.

$$A' = A + \Delta\Psi$$

It is an important feature of the present invention to select a mean crown gear midway within a desirable range of crown gear geometries. An angle (H) is defined between normal plane 38' and a line MP connecting the respective axes of the mean crown gear and cutter assembly. Cutter radius R and the number of blade groups received by the assembly are selected so as to result in an angle (H) of 80° to 85° in accordance with known trigonometric principles relating to the construction shown in FIG. 4. Leading edges of blade slots 46 are substantially aligned with normal plane 38' of the mean crown gear. A pressure angle B and an optimum radial rake angle A are selected on the basis of the job requirement in agreement with principles known in the art. Blade slot inclination angle D is then determined in accordance with the following relationship:

$$\text{TAN }|D| = \text{TAN }|A| \cdot \text{TAN }|B|$$

Ideally, angle A is selected from a range of 15° to 25° and resultant angle D includes a range of 4° to 12°. The crown gear range is further defined to include variation of $\Delta\Psi$ of approximately $-5°$ to $+5°$.

In accordance with the above specification hook angle C' may vary approximately $-2°$ to $+2°$ with reference to normal planes 11'. Coincidence of cutting edges for alternate blades of opposite hand cutting assemblies, however, is independent of absolute hook value. For instance, coincidence may be achieved by providing a positive hook of 2° on the alternate blades of a firsthand assembly and a negative hook of 2° on the corresponding blades of the opposite hand assembly. By providing 0° hook on all blades of a mean crown based assembly according to the principles outlined above, changes of $\Delta\Psi$ result in opposite sign variance for alternate corresponding blades. While such variance is not exactly linear for respective blades, a 5° change of $\Delta\Psi$ results in less than five minutes absolute angular hook difference. This amount of coincidence error is insignificant and is within standard tolerances obtained by conventional sharpening.

Negative hook, however, is usually avoided because of its dulling effect on blades during the cutting process. The present invention within its defined parameters compensates for this effect by providing dramatically increased effective radial rake. The direction of rotation of $\Delta\Psi$ which produces a negative rake also directly adds to effective radial rake. The converse is also true.

This invention in a first exemplary embodiment utilizes a mean pressure angle of 20°(B'), an axial rake of approximately 7.5°(D) and a radial rake of 20°(A). At the extreme case where hook angle is approximately $-2°$ effective radial rake is 25°(A'). Whereas the above situation represents inside blades the outside blades of the same assembly approach a hook angle of $+2°$ and radial rake is diminished to 15°(A').

For certain high volume job requirements it may be practical to adjust radial rake blade angles. Within the limitations of cutting performance corrective radial rake may be specially provided for alternative crown gears to return 0° hook for all blade members. Once provided blades may be resharpened without further need to affect the blade front faces for the specific job requirement. The unexpanded equality given below offers in a simplified form the relationship of radial rake A with normal plane rotation $\Delta\Psi$ necessary to produce 0° hook on all blade members.

$$\text{TAN }(\Delta\Psi + A) = \frac{\text{TAN }D \cdot \text{COS }\Delta\Psi}{\text{TAN }B' + \text{TAN }D \cdot \text{SIN }\Delta\Psi}$$

A second exemplary embodiment which provides radial rake corrections at the extreme range of $\Delta\Psi$, $-5°$ and $+5°$ is offered as an addendum to embodiment 1. Outside blade side rake angles A of approximately 15.5° and 24.4° are provided for normal plane rotations of $-5°$ and $+5°$ respectively. Inside blade side rake angles A are the reverse of outside blade side rake angles for the given rotational values. In each case subsequent to rotation, the effective blade side rake in the cutting plane approaches a median 20° and hook angle C' equals 0°.

It may also be noted that the blade angle considerations offered, thus far, are independent of absolute crown gear dimensions. By providing multiple radial rake blade angles corresponding to incremental variations of $\Delta\Psi$ the overall range of job requirements covered by a single mean crown assembly design is expanded. In other words, by making available two or more different radial rake blade blanks the overall accurancy of the mean crown gear based assembly of the present invention may be enhanced and its potential range expanded.

It is further suggested that an appropriate number of blade groups is selected per cutter assembly in accordance with the structural integrity of the cutter body and that the cutter radius is so selected that at a maximum rotation of $\Delta\Psi$ corresponding to the intended limiting job requirement based upon desired accuracy, angle $\widehat{H}$, as described earlier does not exceed 90°. It is also an aspect of this invention that the mean crown gear is selected midway of the range of intended job requirements wherein $\Delta\Psi$ is 0°.

In the above discussion, both gear members were generated from basic crown gears. The same principles apply when the gear member is cut using no generating motion and the mating pinion is generated with a basic generating member that represents the actual mating gear.

What is claimed is:

1. A face mill type cutter assembly for cutting a range of workgears with a continuously indexing gear cutting machine which utilizes bar stock cutting blades which include a shank portion and a cutting end portion, said shank portion in cross section having a back face, two side faces, a front face, and a fifth face forming a cutting face which defines a rake angle A with said front face, said cutting end portion having two profile surfaces and a top surface wherein one profile surface is inclined an angle B with respect to one of said side faces and intersects said cutting face to form a cutting edge, said cutting face being preserved during periodic resharpening of said cutting end portion characterized by:

a rotatable cutter head having a front face and an axis of rotation, slots formed in said rotatable head for receiving said bar stock blades, a leading edge of each of said slots intersecting said face of said rotatable head in substantial alignment with a plane which includes an angle $\widehat{H}$ with a connecting line between centers of said rotatable head and a workgear within said range viewed in a pitch plane of said workgear, and said slots being inclined by an angle D with respect to the axis of rotation of said rotatable head in accordance with the equality $$\tan|D| = \tan|A| \cdot \tan|B|$$

when said workgear within said range includes an angle $\widehat{H}$ of approximately 80° to 85°.

2. A method of making a cutter assembly for cutting a range of workgears with a continuously indexing gear cutting machine using bar stock type cutting blades which include a shank portion and a cutting end portion, said shank portion in cross section having a back face, two side faces, a front face, and a fifth face forming a cutting face which defines a rake angle A with said front face, said cutting end portion having two profile surfaces and a top surface wherein one profile surface is inclined an angle B with respect to one of said side faces and intersects said cutting face to form a cutting edge, said cutting face being preserved during periodic resharpening of said cutting end portion comprising the steps of:

forming a rotatable head having an axis of rotation, and front and back faces and with slots formed through said front and back surfaces for receiving said blades, aligning a leading edge of each of said slots with a line which includes an angle (H) of approximately 80° to 85° with a connecting drawn line between a center of said rotatable head and a center of one of said workgears selected from said range when viewed in the pitch plane of said one workgear, and inclining said slots an angle D with respect to the axis of rotation of said rotatable head in accordance with the equality $$\tan |D| = \tan |A| \cdot \tan |B|.$$

* * * * *

UNITED STATES PATENT OFFICE
CERTIFICATE OF CORRECTION

PATENT NO. : 4,525,108
DATED : June 25, 1985
INVENTOR(S) : Theodore J. Krenzer

It is certified that error appears in the above-identified patent and that said Letters Patent are hereby corrected as shown below:

In column 3, line 4, delete "accomodate" and substitute --accommodate--;

In column 3, line 16, after the phrase "The blade which is shown", kindly delete "in" and substitute therefor --is--;

In column 3, line 45, delete "had" and substitute --has--;

In column 4, line 8, delete "accomodate" and substitute --accommodate--;

In column 4, line 12, delete "40°" and substitute --40'--;

In column 4, line 12, delete "coincides" and substitute --coincidence--;

In column 6, line 13, delete "accurancy" and substitute --accuracy--.

Signed and Sealed this

Twelfth Day of November 1985

[SEAL]

Attest:

DONALD J. QUIGG

Attesting Officer

Commissioner of Patents and Trademarks